United States Patent [19]

Mori et al.

[11] Patent Number: 4,722,944

[45] Date of Patent: Feb. 2, 1988

[54] EXPANDABLE PARTICLES OF VINYL CHLORIDE RESIN COMPOSITION FOR BEADS-FOAMING

[75] Inventors: Kiyoshi Mori, Kakogawa; Masao Nakagawa, Kobe, both of Japan

[73] Assignee: Kanegafuchi Kagaku Kogyo Kabushiki Kaisha, Osaka, Japan

[21] Appl. No.: 904,589

[22] Filed: Sep. 8, 1986

[30] Foreign Application Priority Data

Sep. 9, 1985 [JP]  Japan ............................. 60-199050

[51] Int. Cl.$^4$ .............................................. C08J 9/18
[52] U.S. Cl. ........................................ 521/59; 521/60; 521/134; 521/56
[58] Field of Search ................... 521/56, 59, 60, 134

[56] References Cited

U.S. PATENT DOCUMENTS

| | | | |
|---|---|---|---|
| 3,879,313 | 4/1975 | Huntzinger et al. | 521/97 |
| 3,975,315 | 8/1976 | Parks | 521/134 |
| 4,025,465 | 5/1977 | Dorrn et al. | 521/134 |
| 4,427,795 | 1/1984 | Dorrestijn et al. | 521/134 |

FOREIGN PATENT DOCUMENTS

| | | |
|---|---|---|
| 48-20020 | 6/1973 | Japan . |
| 48-20021 | 6/1973 | Japan . |
| 53-23342 | 7/1978 | Japan . |
| 55-65241 | 5/1980 | Japan . |
| 55-71727 | 5/1980 | Japan . |

*Primary Examiner*—Morton Foelak
*Attorney, Agent, or Firm*—Armstrong, Nikaido, Marmelstein & Kubovcik

[57] ABSTRACT

An expandable particle of a vinyl chloride resin composition for beads-foaming which comprises (A) a vinyl chloride resin composition comprising (1) a vinyl chloride resin having a difference between $T_1$ and $T_2$ of not higher than 45° C. and (2) 1 to 30 parts by weight of an acrylic resin per 100 parts by weight of the vinyl chloride resin, (B) 2 to 40 parts by weight of an easily volatile organic blowing agent, and (C) 0 to 30 parts by weight of an organic compound capable of dissolving or swelling said vinyl chloride resin, said parts of (B) and (C) being by weight per 100 parts by weight of the vinyl chloride resin composition (A); and said $T_1$ and $T_2$ being measured by a Koka Shiki Flow A-method under conditions of 1 mm in nozzle diameter, 1 mm in nozzle length, 6° C./minute in temperature rise rate and 100 kg/cm$^2$ in load. The expandable particles can be easily molded by beads-foaming to foamed articles having desired complicated shapes with smooth surfaces and high expansion ratios.

3 Claims, No Drawings

EXPANDABLE PARTICLES OF VINYL CHLORIDE RESIN COMPOSITION FOR BEADS-FOAMING

BACKGROUND OF THE INVENTION

The present invention relates to expandable particles of a vinyl chloride resin composition, and more particularly to expandable particles of a vinyl chloride resin composition for beads-foaming which can be easily molded to foamed articles of the vinyl chloride resin composition which have complicated shapes with smooth surfaces by pre-expanding the expandable particles, filling a mold with the pre-expanded particles, and carring out molding in the mold.

As processes for preparing foamed articles of a vinyl chloride resin composition, there have hitherto been known (a) a process in which a chemical blowing agent which gasifies by heat decomposition is admixed with a vinyl chloride resin and the mixture is heat-molded to foamed articles by an extruder or an injection molding machine; (b) a process in which a vinyl chloride resin and a plasticizer are mixed to prepare a plastisol, and the plastisol is mechanically foamed, or a chemical blowing agent is admixed with the plastisol and the mixture is melted and foamed by heating; (c) a process in which a mixture of a vinyl chloride resin and a chemical blowing agent is previously roll-molded at a temperature of not higher than the decomposition temperature of the chemical blowing agent and then foamed by heating; (d) a process in which a mold is filled with a vinyl chloride resin and a chemical blowing agent (if necessary, an easily volatile organic blowing agent and an organic solvent which swells or softens the resin are additionally used), heated under pressure to melt, cooled down, and heated again to foam; (e) a process in which an extruder is charged with a vinyl chloride resin into which a volatile blowing agent is previously impregnated or an extruder is charged with a vinyl chloride resin and then a blowing agent is introduced into the extruder to carry out extrusion foaming; and the like.

However, the above-mentioned processes (a) to (e) have the following various defects.

By the processes (a) to (c), rigid or semi-rigid foamed articles having high expansion ratios cannot be prepared; as to the process (d), the costs of end products are great since the process is a batchwise process of which producing steps are complicated and a lot of time is required for preparing the foamed articles; and as to the process (e), though rigid or semi-rigid foamed articles having high expansion ratios can be relatively easily prepared, foamed articles having complicated shapes cannot be prepared due to extrusion foaming.

Vinyl chloride resin foamed articles have various advantages such as good noninflammability, good toughness and low cost over polystyrene foamed articles. However, there have not been provided expandable particles of vinyl chloride resin which can be molded in high expansion ratios by beads-foaming technique.

An object of the present invention is to provide expandable particles of a vinyl chloride resin composition for beads-foaming which can be easily molded to foamed articles having desired complicated shapes with smooth surfaces.

The above and other objects of the present invention will become apparent from the description hereinafter.

SUMMARY OF THE INVENTION

In accordance with the present invention, there is provided an expandable particle of a vinyl chloride resin composition for beads-foaming which comprises (A) a vinyl chloride resin composition comprising (1) a vinyl chloride resin having a difference between $T_1$ and $T_2$ of not higher than 45° C. and (2) 1 to 30 parts by weight of an acrylic resin per 100 parts by weight of said vinyl chloride resin (1), (B) 2 to 40 parts by weight of an easily organic volatile blowing agent, and (C) 0 to 30 parts by weight of an organic compound capable of dissolving or swelling the vinyl chloride resin composition, said parts of (B) and (C) being by weight per 100 parts by weight of said vinyl chloride resin composition (A); and $T_1$ and $T_2$ being measured by means of a Koka Shiki Flow A-method under conditions of 1 mm in nozzle diameter, 1 mm in nozzle length, 6° C./minute in temperature rise rate and 100 kg/cm² in load.

DETAILED DESCRIPTION

It is necessary that the vinyl chloride resins used in the present invention are those having differences between $T_1$ and $T_2$ of not higher than 45° C. $T_1$ and $T_2$ are measured by means of the Koka Shiki Flow A-method provided by Kobunshi Kagaku Gakkai in Japan under the conditions of 1 mm in nozzle diameter, 1 mm in nozzle length, 6° C./minute in temperature rise rate and 100 kg/cm² in load (refer to Japanese Industrial Standard K7210 "Flow Testing Method (Reference Test)" with respect to the detail of the apparatus used). $T_1$ is the softening point of the resin and $T_2$ is the temperature at which the resin begins to flow out from the nozzle when a load is applied to the resin by a plunger. When a vinyl chloride resin having the difference between $T_1$ and $T_2$ of higher than 45° C. is used, it is difficult to prepare foamed articles having high expansion ratios because the resin is extremely poor in expandability. From such a viewpoint, as a preferable vinyl chloride resin (1) used in the invention, there are exemplified a copolymer of vinyl chloride and vinyl acetate, e.g. a vinyl chloride/vinyl acetate copolymer having an average degree of polymerization of 300 to 3,500 and containing 5 to 20% by weight of vinyl acetate, copolymers of vinyl chloride and various monomers copolymerizable with vinyl chloride such as ethylene and propylene, and the like.

In the present invention, the above specified vinyl chloride resin (1) is used in combination with the acrylic resin (2). The use of the acrylic resin (2) is required in order to suitably control the melt viscosity of expandable particles of a vinyl chloride resin composition of the invention upon foaming, and to increase cell membrane toughness, thereby increasing expandability of the particles upon pre-expanding and moldability of the pre-expanded particles in a mold. As an acrylic resin satisfying the above-mentioned objects, copolymers containing methyl methacrylate as a main component are preferable. Examples of the copolymers are, for instance, a copolymer of methyl methacrylate and an acrylic ester, a copolymer of methyl methacrylate, an acrylic ester and a monomer copolymerizable therewith, and the like. When the content of methyl methacrylate in the acrylic resin (2) is high, the expansion ratio becomes high because elongation of the resin composition increases at a high molding temperature. Accordingly, it is preferable that the content of methyl methacrylate is not lower than 50% by weight.

Examples of the acrylic esters are, for instance, methyl acrylate, ethyl acrylate, n-butyl acrylate, i-butyl acrylate, 2-ethylhexyl acrylate, and the like. Examples of the copolymerizable monomers are, for instance, styrene, an unsaturated nitrile, a vinyl ester, a methacrylic ester, other than methyl methacrylate such as ethyl methacrylate, n-butyl methacrylate and 2-ethylhexyl methacrylate, and the like.

It is desirable that the amount of the acrylic resin (2) is from 1 to 30 parts by weight based on 100 parts by weight of the vinyl chloride resin (1), preferably from 5 to 20 parts by weight. When the amount is smaller than 1 part by weight, the above-mentioned effects cannot be produced. The use of higher than 30 parts by weight of the acrylic resin (2) is not necessary because no further effects are produced on expansion and rather lowers noninflammability originating from the vinyl chloride resin (1).

The acrylic resin (2) and the vinyl chloride resin (1) are melted, mixed and pelletized. The resin composition (A) of the vinyl chloride resin (1) and the acrylic resin (2) may contain usual additives such as stabilizer, lubricant, plasticizer, filler and coloring agent. Known processes for such melting, mixing and pelletizing can be adopted in the invention. For example, after a mixture of the acrylic resin powder, the vinyl chloride resin powder, a stabilizer, and various additives such as a lubricant are melted by heating in an extruder and extruded through holes of a die, and the extrudate is cut by a pelletizer; or after preparing sheets of a molten mixture of the acrylic resin (2) and the vinyl chloride resin (1) by a heat-roll, the sheets are cut into pellets. In addition to the above-mentioned methods, there are many methods variously combining different melting steps and different pelletization steps. Also, pellets can be prepared by suspension polymerization of vinyl chloride monomer in the presence of the acrylic resin (2).

The thus-prepared pellets of the vinyl chloride resin composition are impregnated with a volatile blowing agent (B) in order to give expandability to the pellets. Various volatile orgnaic compounds can be employed in the present invention as the volatile blowing agents (B). Examples of the volatile blowing agent (B) to be impregnated into the pellets are, for instance, aliphatic hydrocarbons such as propane, n-butane, ibutane, n-pentane, i-pentane, neopentane and n-hexane, halogenated aliphatic hydrocarbons such as dichlorodifluoromethane, trichloromonofluoromethane, dichloromonofluoroethane, trichlorotrifluoroethane and dichlorotetrafluoroethane, and the like. The volatile blowing agents (B) may be used alone or in admixture thereof. The amount of the volatile blowing agent (B) to be used depends on desired expansion ratios. In order to prepare foamed articles having a degree of expansion of 2 to 80 cc/g, it is necessary that the amount of the volatile blowing agent (B) is from 2 to 40 parts by weight based on 100 parts by weight of the vinyl chloride resin composition (A). When the amount of the volatile blowing agent (B) is smaller than 2 parts by weight, the desired expansion ratio cannot be achieved. On the other hand, when the amount is larger than 40 parts by weight, foamed articles having higher expansion ratios can be prepared, but such articles do not have good appearance.

The volatile blowing agent (B) can be impregnated into the pellets in various manners. There are, for example, a method in which pellets of the vinyl chloride resin composition (A) are suspended in water in an autoclave equipped with a stirrer and a required amount of the volatile blowing agent (B) is added to the slurry with stirring, whereby the volatile blowing agent (B) is impregnated into the pellets; a method in which the pellets are exposed to the volatile blowing agent (B) in the form of gas or liquid; and the like.

The above-mentioned volatile blowing agents (B) are poor in compatibility with the vinyl chloride resin (1), and therefore their impregnation into the pellets is not satisfactory. Accordingly, for impregnating the pellets with a practical amount of the volatile blowing agent (B), it is preferable to use organic compounds (C) capable of dissolving or swelling the vinyl chloride resin composition (A) along with the volatile blowing agent (B). The organic compounds (C) can be easily impregnated into pellets of the vinyl chloride resin composition (A) and they accelerate impregnation of the volatile blowing agent (B).

Examples of the organic compounds (C) are, for instance, halogenated hydrocarbons capable of dissolving or swelling the vinyl chloride resin (1), such as methyl chloride, methylene chloride, chloroform, carbon tetrachloride, ethyl chloride, ethylidene chloride and trichloroethane, tetrahydrofuran, methyl ethyl ketone, and the like. The organic compounds (C) may be used alone or in a mixture thereof.

The amount of the organic compound (C) is from 0 to 30 parts, preferably from 1 to 15 parts, by weight based on 100 parts by weight of the vinyl chloride resin composition (A). The smaller the amount of the organic compound (C) used is, the longer is the impregnating time. Practically, the amount of 30 parts by weight of the organic compound (C) is enough for impregnation of the volatile blowing agent (B) in a very short time.

On the other hand, it is also possible to incorporate the volatile blowing agent (B) into the composition (A) without using the organic compound (C). For example, the vinyl chloride resin (1), the acrylic resin (2) and the volatile blowing agent (B) are admixed at the same time in an extruder and then pelletization is carried out.

The thus-prepared expandable particles of a vinyl chloride resin composition in the present invention can be easily molded to shaped foamed articles as follows:

The expandable particles are expanded by heating with a heating medium such as steam and hot air to make pre-expanded particles having a desired expansion ratio, and the pre-expanded particles are filled in a mold which is able to be closed, but unable to be sealed and heated with a heating medium such as steam and hot air to make foamed articles of a vinyl chloride resin composition having the same shape as the mold.

The present invention is more specifically described and explained by means of the following Examples in which all percents and parts are by weight unless otherwise noted. It is to be understood that the present invention is not limited to the Examples, and various changes and modifications may be made in the invention without departing from the spirit and scope thereof.

EXAMPLES 1 TO 15

The acrylic resins used in Examples are shown in Table 1.

TABLE 1

| No. | Content of MMA* (%) | Components other than MMA Kind | Content (%) | Reduced viscosity dl/g (25° C.) |
|---|---|---|---|---|
| A-1 | 93 | Butyl acrylate | 7 | 12 |
| A-2 | 90 | Ethyl acrylate | 10 | 10 |
| A-3 | 87 | Ethyl acrylate | 13 | 4 |
| A-4 | 83 | Butyl acrylate | 13 | 13 |
| A-5 | 88 | { Butyl methacrylate / Butyl acrylate | 5 / 7 | 4 |
| A-6 | 60 | Butyl acrylate | 40 | 10 |
| A-7 | 50 | Butyl acrylate | 50 | 10 |
| A-8 | 40 | Butyl acrylate | 60 | 10 |

(Note)
*Methyl methacrylate

A mixture of 100 parts of vinyl chloride-vinyl acetate copolymer powder (vinyl acetate content: 13%, average degree of polymerization: 430, difference between $T_1$ and $T_2$: 24° C., which was measured by means of the Koka Shiki Flow A-method), the acrylic resins which are shown in Table 1 and of which amounts of use are shown in Table 2, 2 parts of dioctyltin maleate as a stabilizer and 0.5 part of fatty ester lubricant (montanic acid ester) was kneaded in an extruder at 180° C. and extruded to make pellets having a diameter of 1.0 mm and a length of 1.5 mm.

In an autoclave equipped with a stirrer, 800 g of the pellets were suspended in 1,200 ml of water containing 1% of calcium tertiary phosphate and 0.0025% of sodium alkylbenzenesulfonate (sodium dodecylbenzenesulfonate) to make a slurry. There were added 120 g of butane and 60 g of ethylene chloride to the slurry with stirring, and the mixture was maintained at 110° C. for 7 hours, cooled to a room temperature and taken out. The prepared expandable particles were stored in a refrigerator at 10° C. for 7 days, and then the aged particles were heated for 1 minute by steam of which temperature is 100° C. to make pre-expanded particles.

The pre-expanded particles were filled in a mold with slits (internal sizes: 30-cm length, 9-cm width, 3-cm thickness) and were heated for 1 minute by steam of which temperature is 105° C. and cooled to 60° C. to make a foamed article of the vinyl chloride resin composition.

The molded foamed article was white and had closed cells which were uniform and fine.

The results are shown in Table 2.

COMPARATIVE EXAMPLE 1

The procedure of Example 1 was repeated except that an acrylic resin was not used. The particles did not fuse together and a foamed article could not be made.

The result is shown in Table 2.

TABLE 2

| | Acrylic resin Kind | Amount | Density (g/cm³) | Surface smoothness* |
|---|---|---|---|---|
| Ex. | | | | |
| 1 | A-1 | 5 | 0.033 | from O to ⊚ |
| 2 | A-1 | 10 | 0.025 | ⊚ |
| 3 | A-1 | 15 | 0.023 | ⊚ |
| 4 | A-1 | 20 | 0.023 | ⊚ |
| 5 | A-2 | 10 | 0.028 | ⊚ |
| 6 | A-3 | 10 | 0.030 | ⊚ |
| 7 | A-4 | 10 | 0.032 | ⊚ |
| 8 | A-5 | 10 | 0.028 | ⊚ |
| 9 | A-6 | 10 | 0.040 | O |
| 10 | A-6 | 15 | 0.035 | O |
| 11 | A-6 | 20 | 0.033 | O |
| 12 | A-7 | 20 | 0.040 | O |
| 13 | A-1 | 1 | 0.038 | Δ |
| 14 | A-8 | 10 | 0.063 | Δ |
| 15 | A-8 | 20 | 0.058 | Δ |
| Com. Ex. | | | | |
| 1 | — | 0 | A foamed article could not be obtained. | — |

(Note)
*The surface smoothness of obtained foamed article is observed with the naked eye.
(Estimation)
⊚ : Excellent
O : Good
Δ : Poor From the Table 2, it is understood that foamed articles having excellent appearance can be prepared from the expandable particles of the present invention. Particularly, when acrylic resins containing not smaller than 50% of MMA are used, the effect of the invention is remarkable. On the other hand, when an acrylic resin is not used, the particles do not fuse together and foamed articles cannot be prepared.

EXAMPLES 16 TO 18 AND COMPARATIVE EXAMPLES 2 AND 3

The procedure of Example 2 was repeated except that the vinyl chloride resins shown in Table 3 were used.

The results are shown in Table 3.

TABLE 3

| | Vinyl chloride resin Component other than vinyl chloride Kind | Content (%) | Degree of polymerization ($\bar{P}$) | Difference between $T_1$ and $T_2$ (°C.) | Expandability | Moldability | Density (g/cm³) |
|---|---|---|---|---|---|---|---|
| Ex. 2 | Vinyl acetate | 13 | 430 | 24 | ⊚ | ⊚ | 0.025 |
| Ex. 16 | Vinyl acetate | 10 | 780 | 40 | O | O | 0.052 |
| Ex. 17 | — | 0 | 450 | 39 | O | O | 0.055 |
| Ex. 18 | Ethylene | 5 | 450 | 25 | ⊚ | ⊚ | 0.030 |
| Com. Ex. 2 | — | 0 | 780 | 61 | X | *1 | |
| Com. | Vinyl | 3 | 780 | 52 | Δ | *2 | |

TABLE 3-continued

| | Vinyl chloride resin | | | | | |
|---|---|---|---|---|---|---|
| | Component other than vinyl chloride | | Degree of polymeri- | Difference between | Expanda- | Molda- | Density |
| | Kind | Content (%) | zation ($\bar{P}$) | $T_1$ and $T_2$ (°C.) | bility | bility | (g/cm³) |
| Ex. 3 | acetate | | | | | | |

(Note)
*1: The particles could not expand and a foamed article could not be made.
*2: The particles could scarcely expand and a foamed article could not be made.

Expandability
After heating particles in a steamer at 100° C. until they expand to be utmost, sizes of the particles are measured.
The expansion ratio (e) is calculated by the following equation.

$$e = \left(\frac{a}{b}\right)^3$$

wherein a is a size of the original particles and b is a size of the expanded particles.
(Estimation)
◎ : Excellent expansion
○ : Good expansion
△: Poor expansion
X: No expansion
Moldability
A mold with slits (length: 30-cm, width: 7-cm, thickness: 3-cm) is filled with pre-expanded particles, heated in an autoclave for 30 minutes by steam under a pressure of 0.5 kg/cm² and cooled in water. The foamed article is taken out from the mold and the surface of the article is observed with the naked eye.
(Estimation)
◎: Excellent
○: Good

EXAMPLES 19 TO 22

The procedure of Example 2 was repeated except that the blowing agents and the organic compounds shown in Table 4 were used.
The results are shown in Table 4.

TABLE 4

| | Blowing agent | | Organic compound | | | | |
|---|---|---|---|---|---|---|---|
| | Kind | Amount (part) | Kind | Amount (part) | Expand-ability | Mold-ability | Density (g/cm³) |
| Ex. 19 | Butane | 10 | Methylene chloride | 5.0 | ◎ | ◎ | 0.028 |
| Ex. 20 | Butane | 10 | Tetrahydrofuran | 7.5 | ◎ | ◎ | 0.031 |
| Ex. 21 | Flon-12*¹ | 20 | Methylene chloride | 7.5 | ◎ | ◎ | 0.026 |
| Ex. 22 | Flon-114*² | 20 | Methylene chloride | 7.5 | ◎ | ◎ | 0.027 |

(Note)
*¹Dichlorodifluoromethane
*²Dichlorotetrafluoroethane

What we claim is:
1. An expandable particle of a vinyl chloride resin composition for beads-foaming which comprises (A) a vinyl chloride resin composition comprising (1) a vinyl chloride resin having a difference between $T_1$ and $T_2$ of not higher than 45° C. and (2) to 1 to 30 parts by weight of an acrylic resin per 100 parts by weight of said vinyl chloride resin (1), (B) 2 to 40 parts by weight of a highly volatile organic blowing agent, and (C) 0 to 30 parts by weight of an organic compound capable of dissolving or swelling said vinyl chloride resin, said parts of (B) and (C) being by weight per 100 parts by weight of said vinyl chloride resin composition (A); $T_1$ being the softening point of the vinyl chloride resin, $T_2$ being the temperature at which the vinyl chloride resin begins to flow from a nozzle when a load is applied to the resin; and said $T_1$ and $T_2$ being measured by a Koka Shiki Flow A-method under conditions of 1 mm in nozzle diameter, 1 mm in nozzle length, 6° C./minute in temperature rise rate and 100 kg/cm² in load.
2. The expandable particle of claim 1, wherein said vinyl chloride resin (1) is a vinyl chloride/vinyl acetate copolymer having an average degree of polymerization of 300 to 3,500 and a vinyl acetate content of 5 to 20% by weight.
3. The expandable particle of claim 1, wherein said acrylic resin (2) contains not less than 50% by weight of methyl methacrylate.

* * * * *